US008534629B2

(12) United States Patent
Hennings et al.

(10) Patent No.: US 8,534,629 B2
(45) Date of Patent: Sep. 17, 2013

(54) ADJUSTABLE SCUBA TANK HOLDER

(76) Inventors: Ivar Hennings, Fort Myers, FL (US);
Richard L. Ronco, Alva, FL (US)

( * ) Notice: Subject to any disclaimer, the term of this patent is extended or adjusted under 35 U.S.C. 154(b) by 137 days.

(21) Appl. No.: 13/228,308

(22) Filed: Sep. 8, 2011

(65) Prior Publication Data

US 2012/0056058 A1    Mar. 8, 2012

Related U.S. Application Data

(60) Provisional application No. 61/380,755, filed on Sep. 8, 2010.

(51) Int. Cl.
*A47K 1/00* (2006.01)
(52) U.S. Cl.
USPC .................. 248/313; 248/297.31; 248/316.1; 248/316.7
(58) Field of Classification Search
USPC ................ 248/309.1, 311.2, 311.3, 313, 314, 248/316.1, 316.5, 316.7, 316.8, 297.31, 520, 538, 903; D8/373, 396; D29/130
See application file for complete search history.

(56) References Cited

U.S. PATENT DOCUMENTS

| 4,848,714 | A  | * | 7/1989  | Ziaylek et al. | 248/313   |
| 4,876,980 | A  | * | 10/1989 | Bell, III      | 114/364   |
| 5,586,517 | A  | * | 12/1996 | Willis et al.  | 116/173   |
| 6,220,557 | B1 | * | 4/2001  | Ziaylek et al. | 248/316.1 |
| 6,926,243 | B1 | * | 8/2005  | Ziaylek et al. | 248/307   |
| 8,220,764 | B2 | * | 7/2012  | Ziaylek        | 248/312   |

* cited by examiner

*Primary Examiner* — Gwendolyn Baxter
(74) *Attorney, Agent, or Firm* — Sinorica, LLC

(57) ABSTRACT

An adjustable scuba tank holding device fixed to the gunwale or other structure of a water craft used for holding and/or assisting a user on the donning or doffing of the buoyancy control device and compressed air tank. The adjustable scuba tank holding device is adjustable to hold different sized tanks. The adjustable scuba tank holding device stabilizes the tank to provide easy donning or doffing of the scuba BCD/tank. As a result, the safety of a scuba diver on a water craft is significantly increased.

3 Claims, 4 Drawing Sheets

ADJUSTABLE SCUBA TANK HOLDER

The current application claims a priority to the U.S. Provisional Patent application Ser. No. 61/380,755 filed on Sep. 8, 2010.

FIELD OF THE INVENTION

The present invention relates generally to a scuba tank holder, more specifically, to a scuba tank holder for donning and doffing a scuba tank with a Buoyancy Control Device (BCD) attached when on a vessel preparing for a dive.

BACKGROUND OF THE INVENTION

Traditionally, scuba divers must manually put on and/or remove the scuba tank and Buoyancy Control Device (BCD) which can weigh as much as 21 pounds when full with weights and compressed air. For some users, the BCD/tank assembly can be too heavy and difficult to carry. As a result, the weight makes the BCD/tank difficult to put on/take off. Traditionally, scuba divers are required to contort their bodies to strap the BCD/tank to their backs. Maneuvering and handling a heavy apparatus can cause the user to lose balance and risk injury or even death if not handled properly and with caution. Additionally, handling of the scuba tank can be especially dangerous and uneasy on a swaying vessel. The present invention provides a safe and easy way for scuba divers to don and doff the scuba BCD/tank assembly by keeping it secured in a vertical position while sitting on the gunwale or other structure of the vessel.

DETAIL DESCRIPTIONS OF THE INVENTION

All illustrations of the drawings are for the purpose of describing selected versions of the present invention and are not intended to limit the scope of the present invention.

The present invention is a removable adjustable support apparatus for assisting a scuba diver in donning and doffing a buoyancy control device (BCD) and a compressed gas tank while on a watercraft. The present invention is especially useful on a swaying watercraft as it stabilizes the heavy BCD/tank apparatus. Without the present invention, users are forced to handle and strap the BCD/tank apparatus onto their back by contorting their body to slide their arms through the associated straps. As a result, the heavy BCD/tank apparatus can easily throw the user off balance on an already swaying watercraft. The present invention is secured to the gunwale or another structure on the watercraft. The physical connection of the present invention to a structure of the watercraft allows the user to fix the BCD/tank to the watercraft as they don or doff the apparatus. As the users only need to concentrate efforts on balancing their own body without the interference by the weight of a BCD/tank apparatus, the donning and doffing of the BCD/tank is significantly simplified.

Figure 3:
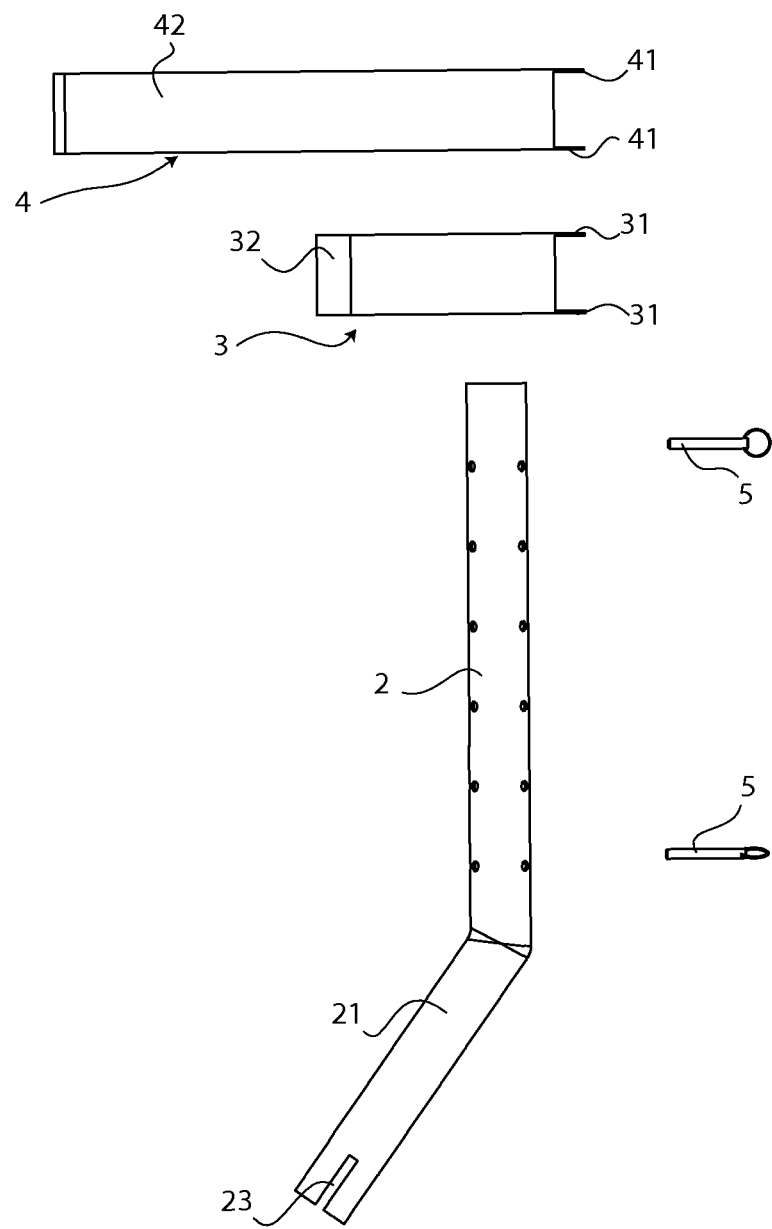
FIG. 3 is an exploded view of the present invention.

In reference to FIG. 3, the present invention comprises a rod holder, a support tube 2, a bottom stabilizer clip 3, a top compression clip 4, and a pair of quick release pins 5. The rod holder is a cylindrical compartment that is positioned in the gunwale. The rod holder provides the support tube 2 a recessed space to be inserted and held. The support tube 2 is the main structure of the present invention for holding the BCD/tanks up straight. The bottom stabilizer clip 3 and the top compression clip 4 are the fastening devices that secure the BCD/tank to the support tube 2. The pair of quick release pins 5 is used to secure the bottom stabilizer clip 3 and the top compression clip 4 to the support tube 2.

Figure 1:
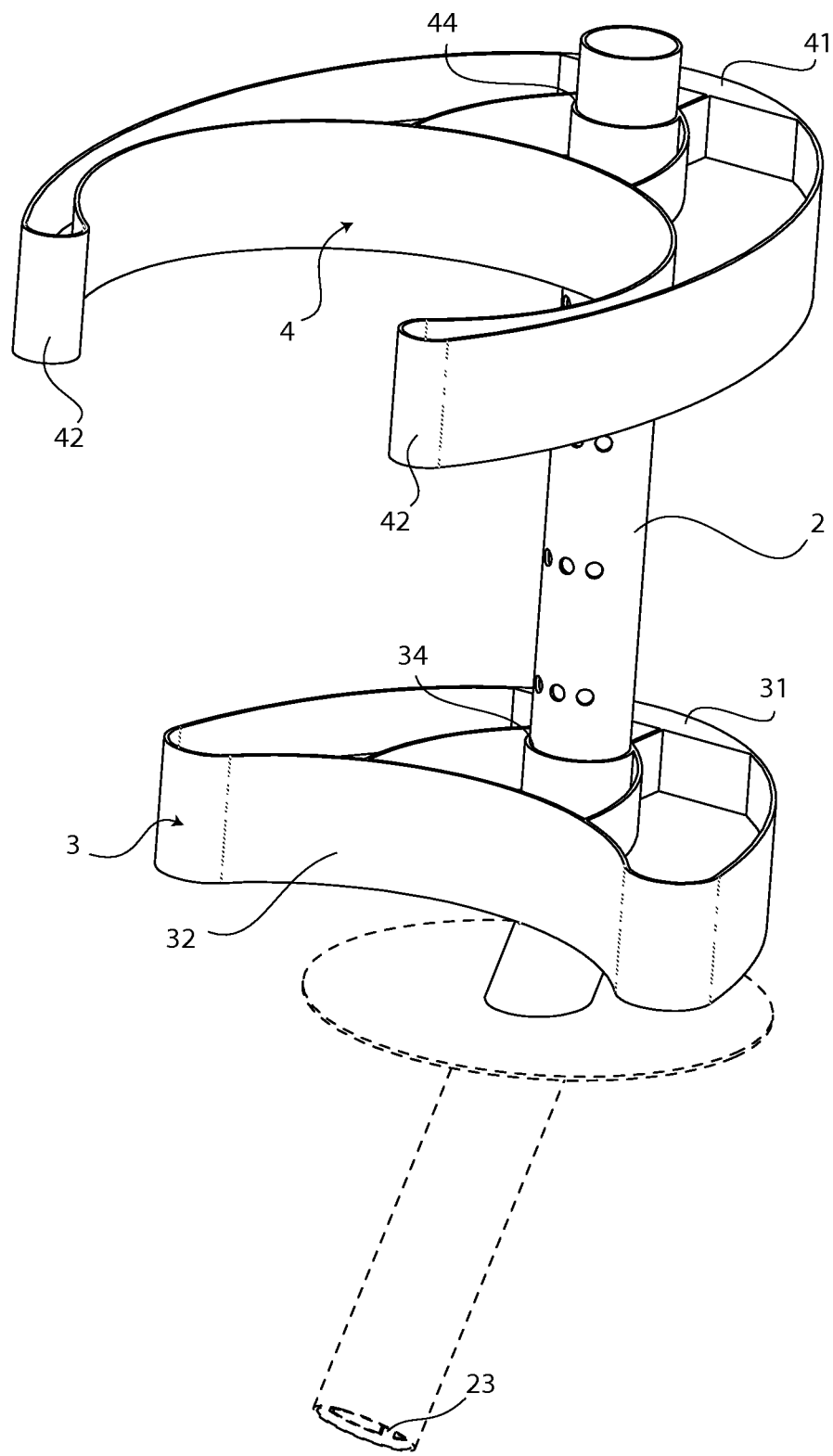
FIG. 1 is a perspective view of the present invention.

In reference to FIG. 1, the rod holder is a cylindrically shaped compartment that further comprises a mount plate, a rod channel, and a pivot inhibitor. The rod holder has a angled end and a bottom holder end. With the rod holder being a cylindrical shaped compartment inserted into a gunwale at an angle, the angled end is aligned with the surface of the gunwale. The mount plate is a ring plate that is connected concentrically about the angled end of the rod holder. The rod channel is a recessed cylindrical space traversing in concentric relationship through the rod holder from the angled end. The mount plate is connected to the rod holder on the angled end around the opening of the rod channel to provide the support tube 2 access. The pivot inhibitor is a bar that is attached across the width of the rod channel and is positioned adjacent to the bottom holder end.

Figure 2:
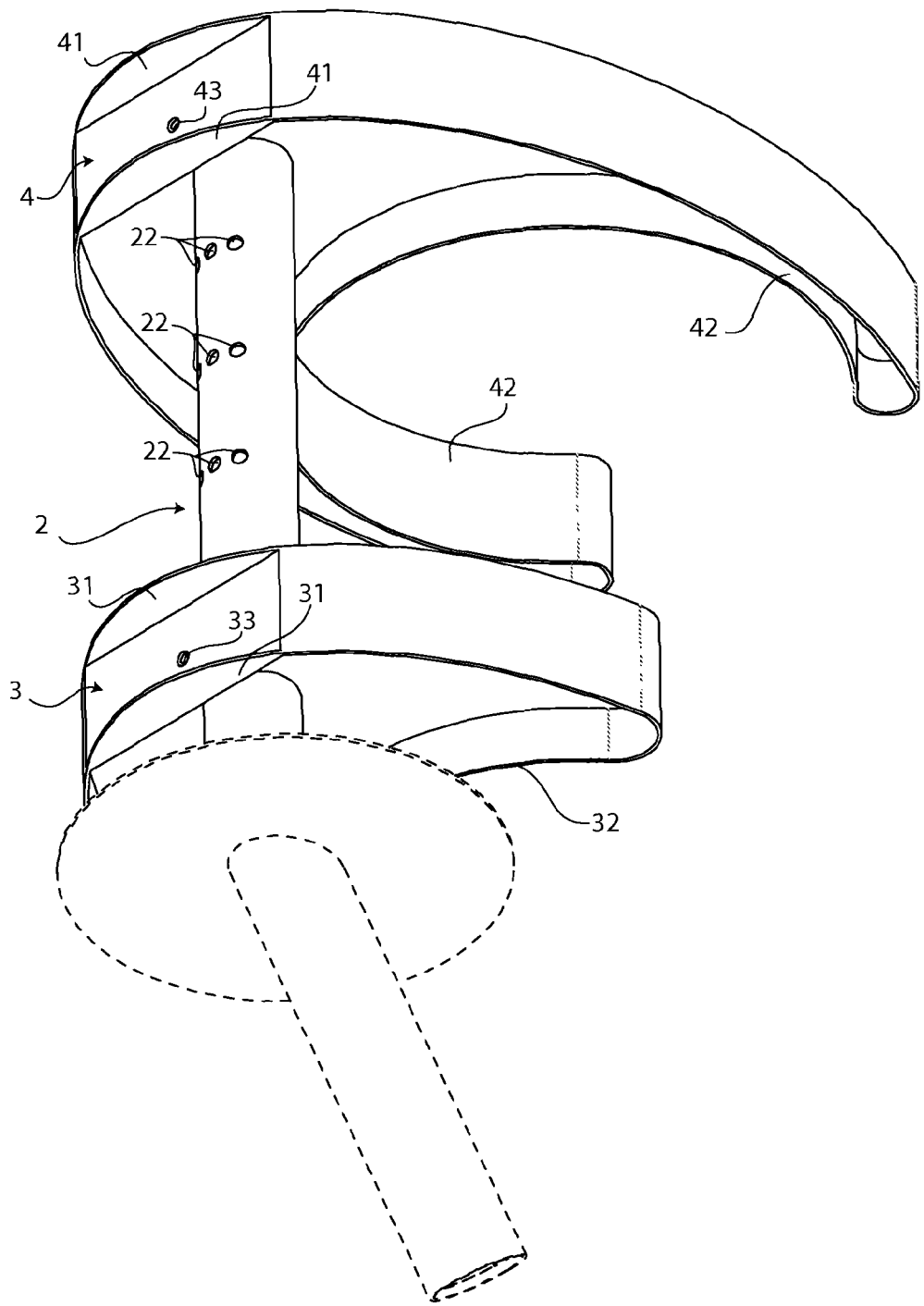
FIG. 2 is a rear perspective view of the present invention showing the plurality of holes for the adjustments of the top compression clip and the bottom stabilizer clip.

In reference to FIG. 2, the support tube 2 is the structural component of the present invention that holds a BCD/tank up straight on the gunwale. The support tube 2 further comprises of a rod mount 21, a plurality of holes 22, and a slot 23. The rod mount 21 is extended from the bottom end and is angled away from the support tube 2. The rod mount 21 provides the support tube 2 with a segment to be inserted into and be supported by the rod holder. The angling of the rod mount 21 from the support tube 2 and the angling of the rod holder in the gunwale prevents any vertical movement of the support tube 2 while docked onto the gunwale. The prevention of vertical movement is especially useful in stabilizing the support tube 2 on a swaying boat. Additionally, while the user is donning or doffing the BCD/tank, there may be some vertical interference with the support tube 2. The angling of the rod mount 21 allows the support tube 2 to remain securely docked to the rod holder and gunwale without disengaging and potentially falling into the water. The plurality of holes 22 is holes that are laterally traversing through the support tube 2 and linearly and evenly distributed along the length of the support tube 2. The plurality of holes 22 provides the present invention the adjustability for holding different sized compressed air tanks for differently sized users. The plurality of holes 22 are also distributed laterally at different angles through the support tube 2 to provide lateral adjustability. This feature allows a user to readjust the top compression clip 4 and the bottom stabilizer clip 3 to be aligned with the gunwale. The plurality of holes 22 are provided for vertical and horizontal adjustment of the top compression clip 4 and the bottom stabilizer clip 3 to clear any BCD straps and to provide scuba tank alignment with the gunwale. The top compressions clip 4 and the bottom stabilizer clip 3 are designed to adjust so the scuba tank can be set in line with the gunwale to provide maximum support. In the preferred embodiment of the present invention, the top compression clip 4 is designed for a standard 7.5 inch diameter scuba tank installed in a standard 30 degree 8 inch deep rod holder. The slot 23 is positioned at a bottom end of the rod mount 21 and allows the support tube 2 to engage the pivot inhibitor of the rod holder.

In reference to FIG. 1-2, the bottom stabilizer clip 3 and the top compression clip 4 are secured onto the support tube 2. The bottom stabilizer clip 3 further comprises of a stabilizer tab 31, a tank stabilizer 32, a bottom pin hole 33, and a stabilizer tube hole 34. The top compression clip 4 further comprises of a compression tab 41, a pair of tank compression claws 42, a top pin hole 43, and a compression tube hole 44. The stabilizer tab 31 allows the user to maneuver the bottom stabilizer clip 3 up and down the support tube 2. Similarly, the compression tab 41 allows the user to maneuver the top compression clip 4 up and down the support tube 2. The stabilizer tab 31 and the compression tab 41 are extended from the bottom stabilizer clip 3 and the top compression clip 4, respectively. The tank stabilizer 32 is shaped conformingly to a compressed air tank and is used to prevent small movements of a tank being secured by the present invention. The tank stabilizer 32 is extended from the bottom stabilizer clip 3 on the opposite side to the stabilizer tab 31. The tank compression claw, unlike the tank stabilizer 32, is used to securely hold onto a compressed air tank. The tank compression claws 42 are extended from the top compression clip 4 opposite of the compression tab 41. The tank compression claws 42 use two corresponding claws that allow the user to snap in or release a tank of compressed air. The stabilizer tube hole 34 and the compression tube hole 44 are holes traversing through the bottom stabilizer clip 3 and the top compression clip 4, respectively. The stabilizer tube hole 34 and the compression tube hole 44 allow the bottom stabilizer clip 3 and the top compression clip 4 to be secured to the support tube 2. However to fix the vertical positioning of the bottom stabilizer clip 3 and the top compression clip 4, the bottom pin hole 33 and the top pin hole 43 must be aligned to the desired holes of the plurality of holes 22. The bottom pin hole 33 is a small hole traversing through the bottom stabilizer clip 3 into the stabilizer tube hole 34. The bottom pin hole 33 is positioned adjacent to the stabilizer tab 31. The top pin hole 43 is a small hole traversing through the top compression clip 4 into the compression tube hole 44. The top pin hole 43 is positioned adjacent to the compression tab 41.

Figure 4:
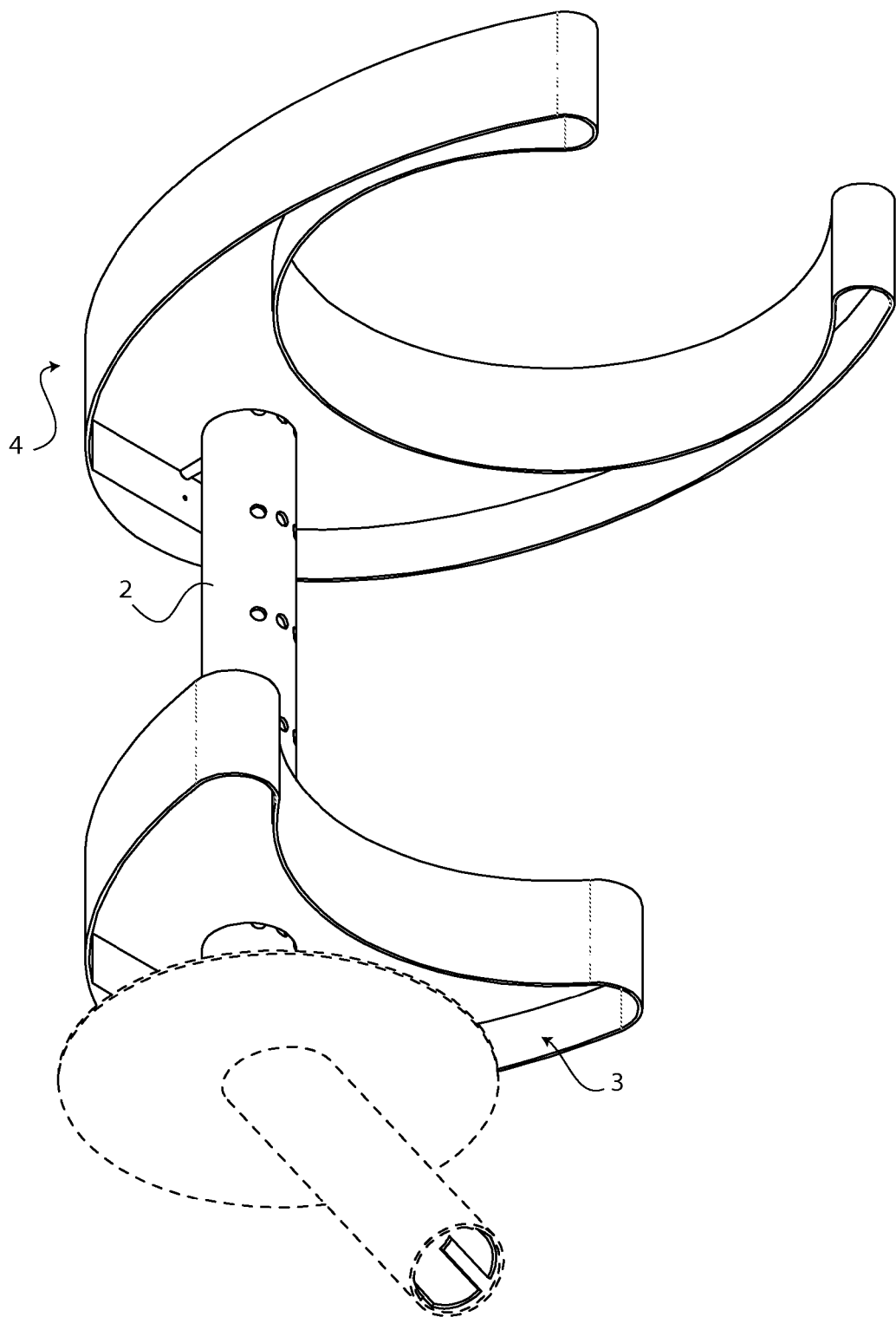
FIG. 4 is a bottom view of the present invention showing the pivot inhibitor engaging the slot.

In reference to FIG. 3-4, the present invention is assembled by the connection of corresponding parts. The support tube 2 is traversed through the stabilizer tube hole 34 and the compression tube hole 44. With the support tube 2 traversed through, the thickness of the bottom stabilizer clip 3 and the top compression clip 4 prevents any play. However, the matching shape and size of the stabilizer tube hole 34 and the compression tube hole 44 with the support tube 2 allows the bottom stabilizer clip 3 and the top compression clip 4 to freely slide up and down the support tube 2. To fix the vertical positioning of the bottom stabilizer clip 3, the bottom pin hole 33 is aligned to a first hole of the plurality of holes 22. To fix the vertical positioning of the top compression clip 4, the top pin hole 43 is aligned to a second hole of the plurality of holes 22. The pair of quick release pins 5 consisting of a first pin and a second pin. The first pin is inserted through the bottom pin hole 33 and the first hole to fix the positioning of the bottom stabilizer clip 3. The second pin is inserted through the top pin hole 43 and the second hole to fix the positioning of the top compression clip 4 on the support tube 2. The rod mount 21 is inserted to the rod channel with the pivot inhibitor being positioned into the slot 23. It is preferred that the rod holder has a 30 degree flush mounted design to have good structural integrity, free of corrosion, and securely fastened to the gunwale to provide a secure and stable platform for utilizing the present invention. The engagement of the pivot inhibitor into the slot 23 prevents the pivoting of the support tube 2 within the rod channel. The pivot inhibitor supports the support tube 2 in an upright vertical position. Without the pivot inhibitor, the support tube 2 may pivot to an angle that is not perpendicular to the surface of the gunwale. To adjust the top compression clip 4 or the bottom stabilizer clip 3, the user can simply remove the corresponding quick release clip for alignment to another hole of the plurality of holes 22. Once aligned, the user can simply replace the quick release pin to fix the position of the adjusted clip. If the connection between the support tube and the rod holder is loose with some play. The user is able to insert a wedge into the remaining space between the support tube and the rod holder to provide a tighter fit. The wedge can be inserted between the inside liner of the rod holder and the support tube while the support tube is being inserted. To provide additional security of an air tank to the present invention, the user can fasten the air tank to the support tube with a hook and loop style safety strap. The safety strap will secure the scuba tank to the present invention while the vessel is on plane. The safety strap is a critical component to insure against any unforeseeable events from occurring. Once the diving destination is reached, the user can simply remove the safety strap and don the BCD/air tank to be ready for disengagement from the present invention for diving. The maintenance of the present invention simply requires the user to rinse each part thoroughly and to lubricate the quick release pins with silicone marine lubricants.

In another embodiment of the present invention, the support tube 2 consists of an outer tube and an inner tube for telescoping adjustability. In this embodiment of the present invention, the inner tube comprises an inner hole and the outer tube comprises a plurality of holes 22. The length of the support tube 2 is adjustable by aligning the inner hole with different holes of the plurality of holes 22. The bottom stabilizer clip 3 is fixed to the base of the support tube 2 and the top compression clip 4 is fixed to the top of the inner tube. As a result, when the user adjusts the length of the support tube 2, they adjust the distance between the top compression clip 4 and the bottom stabilizer clip 3. To fix the length of the support tube 2, a quick release pin is inserted through the inner hole and one of the holes of the plurality of holes 22.

Although the invention has been explained in relation to its preferred embodiment, it is to be understood that many other possible modifications and variations can be made without departing from the spirit and scope of the invention as hereinafter claimed.

What is claimed is:

1. An adjustable scuba tank holder comprises,
   a support tube;
   a bottom stabilizer clip;
   a top compression clip;
   a pair of quick release pins;
   the support tube comprises a rod mount, a plurality of holes, and a slot;
   the bottom stabilizer clip comprises a bottom pin hole, stabilizer tab, a tank stabilizer, and a stabilizer tube hole;
   the top compression clip comprises a top pin hole, a compression tab, a pair of tank compression claws, and a compression tube hole;
   the rod mount being extended from the support tube and being angled from the support tube;
   the plurality of holes being laterally traversed through the support tube and being linearly distributed along the support tube;
   the slot being positioned at a bottom end of the rod mount;
   the support tube being traversed through the stabilizer tube hole and the compression tube hole;
   the bottom pin hole being aligned to a first hole of the plurality of holes;
   the top pin hole being aligned to a second hole of the plurality of holes;

the pair of quick release pins consisting of a first pin and a second pin;

the first pin being inserted through the bottom pin hole and the first hole; and the second pin being inserted through the top pin hole and the second hole.

2. The adjustable scuba tank holder as claimed in claim 1 comprises, the stabilizer tab being extended from the bottom stabilizer clip;

the tank stabilizer being extended from the bottom stabilizer clip opposite of the stabilizer tab;

the stabilizer tube hole being a hole traversing through the bottom stabilizer clip; and the bottom pin hole being a small hole traversing through the bottom stabilizer clip into the stabilizer tube hole and being positioned adjacent to the stabilizer tab.

3. The adjustable scuba tank holder as claimed in claim 1 comprises, the compression tab being extended from the top compression clip;

the tank compression claws being extended from the top compression clip opposite of the compression tab;

the compression tube hole being a hole traversing through the top compression clip; and the top pin hole being a small hole traversing through the top compression clip into the compression tube hole and being positioned adjacent to the compression tab.

\* \* \* \* \*